(12) United States Patent
Rabin et al.

(10) Patent No.: US 10,169,219 B2
(45) Date of Patent: Jan. 1, 2019

(54) SYSTEM AND METHOD TO INFER CALL STACKS FROM MINIMAL SAMPLED PROFILE DATA

(71) Applicant: Nintendo Co., Ltd., Kyoto (JP)

(72) Inventors: Steven Rabin, Redmond, WA (US); Chad Hinkle, Redmond, WA (US)

(73) Assignee: Nintendo Co., Ltd., Kyoto (JP)

(*) Notice: Subject to any disclaimer, the term of this patent is extended or adjusted under 35 U.S.C. 154(b) by 74 days.

(21) Appl. No.: 14/692,173

(22) Filed: Apr. 21, 2015

(65) Prior Publication Data

US 2016/0314063 A1 Oct. 27, 2016

(51) Int. Cl.
| | | |
|---|---|---|
| *G06F 9/44* | (2018.01) | |
| *G06F 11/36* | (2006.01) | |
| *G06F 11/30* | (2006.01) | |

(52) U.S. Cl.
CPC .......... *G06F 11/3688* (2013.01); *G06F 11/30* (2013.01); *G06F 11/3612* (2013.01)

(58) Field of Classification Search
CPC ............. G06F 11/3636; G06F 11/3612; G06F 11/3604; G06F 2201/865
See application file for complete search history.

(56) References Cited

U.S. PATENT DOCUMENTS

| | | | | |
|---|---|---|---|---|
| 6,662,358 B1* | 12/2003 | Berry | ...................... | G06F 17/30 |
| | | | | 714/47.2 |
| 8,732,681 B2* | 5/2014 | Sale | ...................... | G06F 11/366 |
| | | | | 717/128 |
| 9,015,684 B1* | 4/2015 | Koh | ...................... | G06F 11/3466 |
| | | | | 717/151 |

OTHER PUBLICATIONS

Todd Mytkowicz et al., Inferred Call Path Profiling, ACM, 2009, retrieved online on Aug. 6, 2018, pp. 175-189. Retrieved from the Internet: <URL: http://delivery.acm.org/10.1145/1650000/1640102/p175-mytkowicz.pdf?i>. (Year: 2009).*

* cited by examiner

*Primary Examiner* — Hanh Thi-Minh Bui
(74) *Attorney, Agent, or Firm* — Nixon & Vanderhye, P.C.

(57) ABSTRACT

Methods and systems for inferring call stacks in a program, such as a video game or simulation program, are described herein. The call stack data can be inferred using a database of previously captured call stacks along with a minimal set of identifiers that fingerprint each call stack. If just the minimal fingerprint can be captured during a subsequent profile, then the corresponding call stack can be inferred.

22 Claims, 16 Drawing Sheets

SYSTEM AND METHOD TO INFER CALL STACKS FROM MINIMAL SAMPLED PROFILE DATA

BACKGROUND

An inference is a process of deriving a conclusion based on premises that are known or assumed to be true. Inferences come in many different forms. For example, mathematics can apply statistical inferences to draw conclusions in situations of uncertainty. Logical inferences can be drawn to deduce conclusions based on known facts and/or assumptions. Inferences have a variety of applications and can even be used when profiling a running software program.

DETAILED DESCRIPTION OF EXAMPLE NON-LIMITING EMBODIMENTS OF THE TECHNOLOGY

Figure 1:
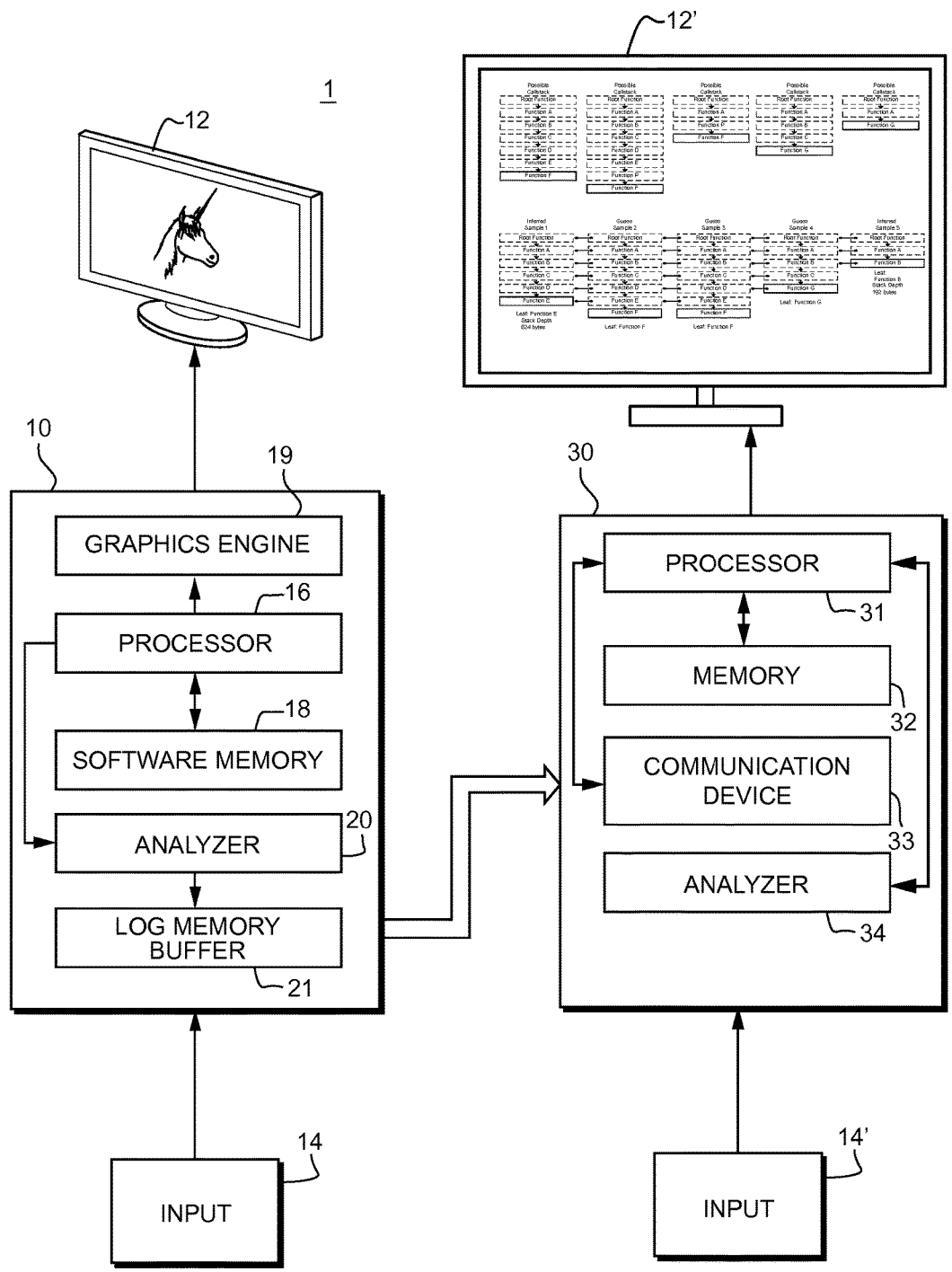
FIG. 1 is a non-limiting example block diagram of a software profiling system.

Software profilers aid in analyzing the dynamic behavior of a computer program (e.g., for optimizing the program's performance or finding bugs or other problems). Commonly-assigned U.S. application Ser. Nos. 12/533,845, 12/534,048, 14/165,818, 14/249,514, and 14/288,747 (all of which are incorporated herein by reference) describe example profilers. This disclosure describes various embodiments to improve upon current software profiler systems in order to infer call stacks from minimal sampled profile data.

A running computer program can be profiled, essentially monitoring and capturing a running program's behavior. A profiler can use a statistical-based approach in order to minimally impact the behavior of the running program. A profiler works by periodically interrupting the program, recording pertinent information, then allowing the program to run again. During each sample, information such as the currently running function or the entire call stack can be recorded, among other possibilities.

Recording an entire call stack during a sample is highly desirable since it sheds much more light on the actual behavior of the program compared with only capturing the currently running function. Unfortunately, on particular CPU architectures such as ARM®, capturing a call stack is extremely time consuming, which adversely affects the program behavior and reduces the number of samples that can be taken in a given period of time. Therefore, it would be advantageous if the call stack could be inferred from a minimal amount of information, rather than analyzed and recorded directly. Another benefit is that the recorded data is much smaller, allowing for more samples to be recorded given a fixed-sized buffer.

Example embodiments of the technology of this application presents systems and methods in which call stack data can be inferred using a database of previously captured call stacks along with a minimal set of identifiers that fingerprint each call stack. If just the minimal fingerprint can be captured during a subsequent profile, then the corresponding call stack can be inferred. When sampling a call stack, certain fingerprint identifiers can be recorded. These fingerprint identifiers include stack depth size in bytes, CPU core, and/or thread ID. In one example embodiment, recording the stack depth in bytes is required in the process where recording the CPU core and thread ID are optional. The same fingerprint identifiers can be recorded during a minimal non-call stack profile that records the currently running function. Using one or more fingerprint identifiers, the systems and methods can infer that a particular call stack corresponds to our minimal non-call stack sample.

It should be appreciated that the fingerprint ID is not limited to the stack depth size, CPU core, and/or thread ID and could contain a variety of other identifiers. For example, the fingerprint ID could also include where in the frame a particular call stack occurs. These examples of course are non-limiting and the technology described herein envisions a variety of identifiers that could be included in the fingerprint ID.

These processes for inferring the call stacks are effective because of how functions operate in conjunction with the stack. That is, the stack is a dedicated area in memory where temporary data and bookkeeping information is stored to facilitate function processing and function calls. When a function runs, it might store temporary data on the stack, thus increasing the total amount of stack space being used. When a function call takes place, the currently running function will store to the stack its address (e.g., the return address) and store arguments that the soon to be executed function will need. As functions successively call each other and run, the depth of the stack increases (e.g., stacks grow downward in the memory space, thus resulting in "stack depth" where a deeper stack implies a larger stack). Thus, at any point during a running program, the exact depth of the stack in bytes is a result of every function in the current call stack, making the current function and stack depth in bytes indicative of the current call stack. Different call stacks could result in the same stack depth value in bytes, but in actual production software it is somewhat rare.

Figure 2:
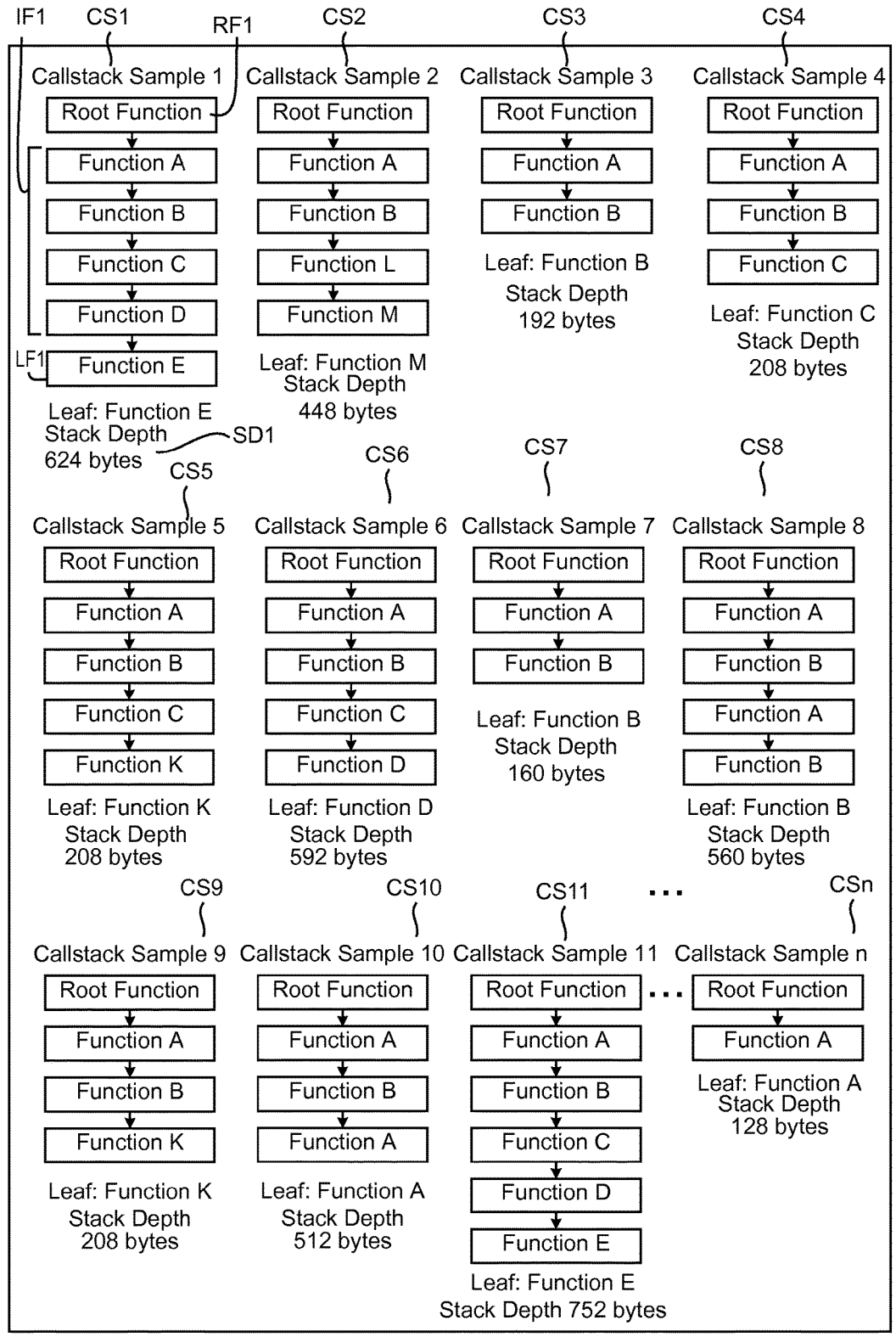
FIG. 2 shows a non-limiting example diagram for sampling one or more functions to build a database.
Figure 3:
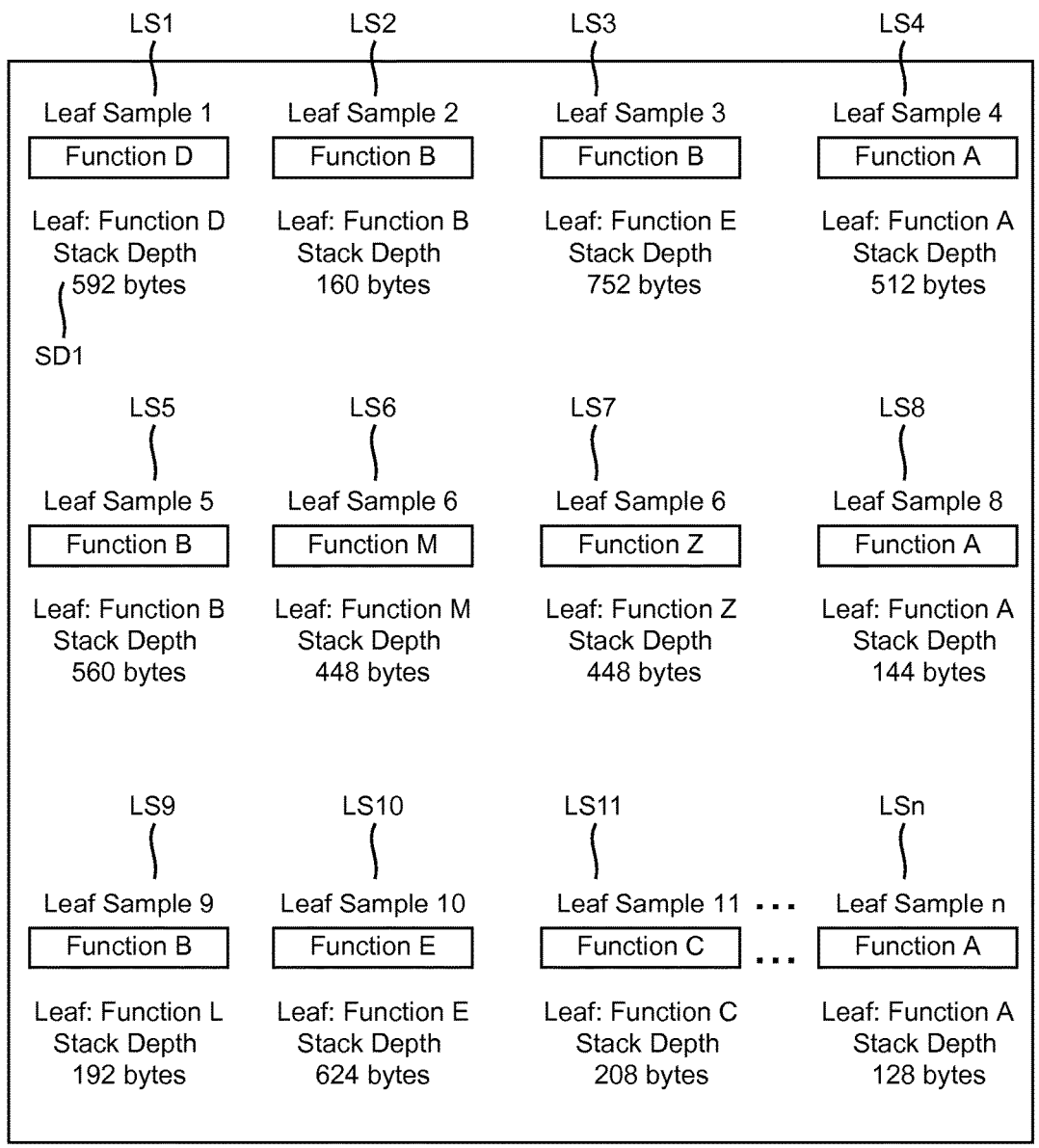
FIG. 3 shows a non-limiting example diagram for profiling functions executing in a software program.
Figure 4:
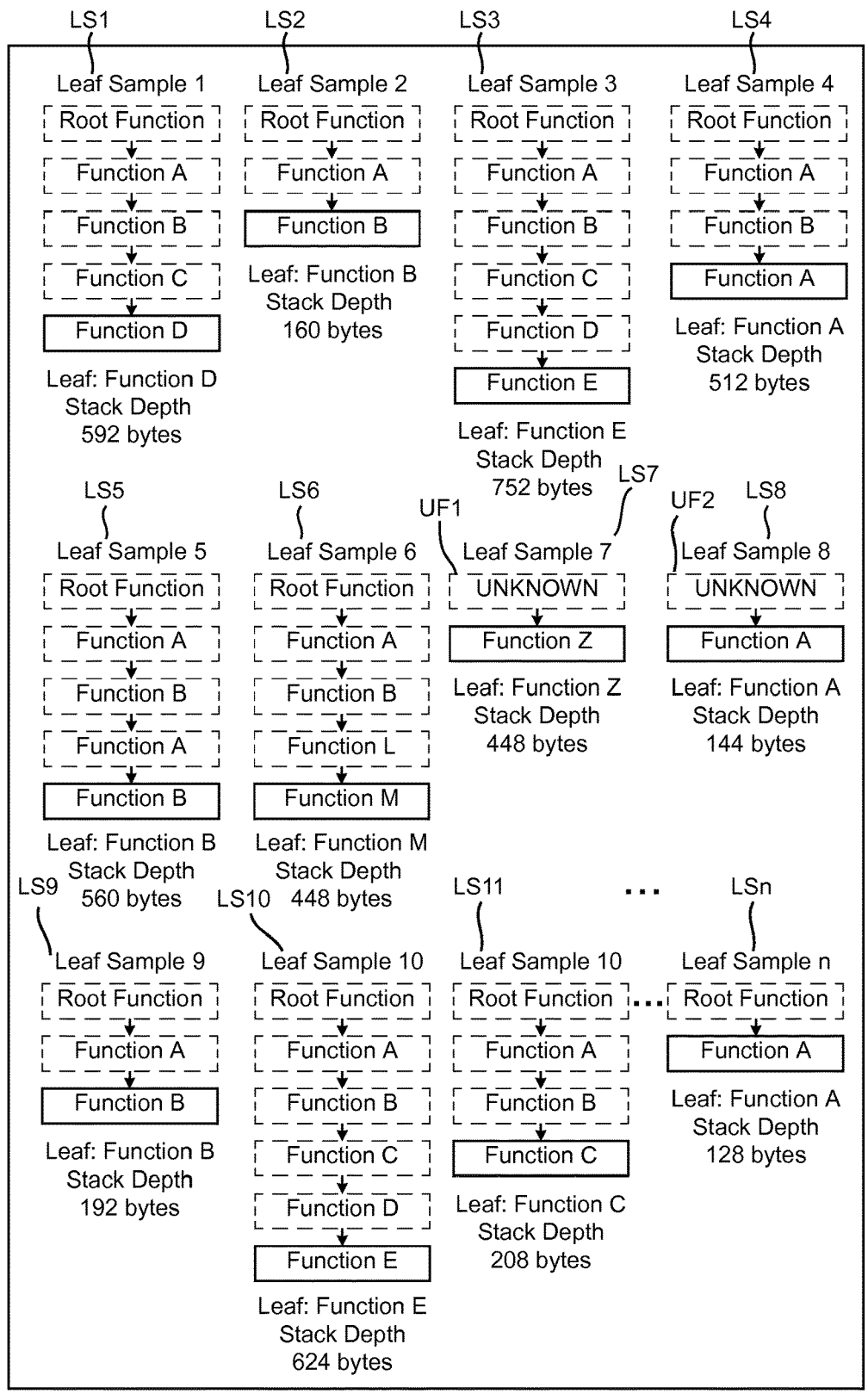
FIG. 4 shows a non-limiting example diagram for matching one or more profiled functions to functions in the database.

These processes have yielded an observation that the matching from previous call stack profiles will allow roughly 70% to 95% of call stacks to be inferred, as shown in FIGS. 2-4, and described in detail below. The remaining call stacks can be "guessed" through a combination of static analysis of function calls and the neighboring inferred call stacks, as shown in FIGS. 9-15, and described in detail below. It should be appreciated that the strategies shown and described in FIGS. 9-15 leverage at least two key observations: (a) the actual call stack is likely very similar to the sample before and/or after the one in question, and (b) shorter call stacks are statistically more likely than longer ones.

The technology described herein is thus directed to creating a sample profile of functions executing in a running program. This profile is then used during further sampling of an executing program to infer call stacks from running functions by, at least, comparing the stack depth size and currently sampled function to stack depth sizes and "leaf" functions (e.g., the last called function in a particular call stack) in the sample profile. It should be appreciated that the specification may refer to "stack depth size" and "call stack." As a non-limiting example, stack depth size could preferably refer to the depth of a stack in bytes (e.g., a size of a block of memory) where the call stack could preferably refer to functions comprising a call stack (e.g., called functions from a root function to a leaf function).

It should be appreciated that the techniques described herein can also utilize a weighting technique that assigns weights to different inference strategies (as a non-limiting example, those strategies described herein and as shown in FIG. 4 through 11) and their converted inferred call stack so that certain inferences in the analysis will be weighted with a higher degree of confidence than others. In one non-limiting example implementation, inferred call stacks using samples from the call stack database will be given a higher confidence weight while those using only neighbor evidence will be given a lower confidence weight. By utilizing these weights, any number of inference strategies may be used to determine the inferred call stack, from a single inference strategy to all inference strategies. The inference strategy that produces an inferred call stack with the highest degree of confidence will then be the one selected as the inferred call stack provided back to the user. Thus, a user may have some perspective as to the confidence level with which samples were converted to inferred call stacks.

Example Software Profiling System

FIG. 1 is a block diagram showing an illustrative non-limiting implementation of a software profiling system 1, which can include, for example, an embedded computing device. The software profiling system 1 can be used, for example, in classifying and displaying types of anomalous behavior in software execution. Although example software profiling system 1 can be specifically used for analyzing video game software, it should be understood that it can profile any type of software. System 1 runs functions while also providing analysis. The system 1 includes a computing system 10 connected to a display 12 (or display device 12) and an input device 14. The computing system 10 includes a processor 16, which can execute a video game or other program. The game or other program can be stored in a non-transitory game software memory 18. System 1 further includes a graphics engine 19 that generates graphics for display on the display 12. The system 1 is not limited to a single processor or memory, but can comprise multi-core architecture, multiple processors and/or multiple memories, and/or remotely accessed network (e.g., cloud) computing components. Input from input device 14 can affect/control program execution.

The graphics engine 19 includes a frame buffer memory that composes images periodically at a frame rate (e.g., every $1/30^{th}$ or $1/60^{th}$ of a second) and reads out the images for display on the display 12. Frame refresh rate may be controlled by a timer that interrupts the processor 16 periodically or non-periodically. Display 12 may output audio/video data from the program being executed on system 10.

The computing system 10 can further include an analyzer 20 used in gathering the program execution data when the processor 16 executes a software program. The analyzer 20 can be implemented in any combination of software, hardware, and firmware. In one non-limiting illustrative embodiment, the analyzer 20 is a form of a software profiler that monitors a sequence of operations performed by the processor 16 while the processor executes the software program. The analyzer 20 collects data, which may specify various functions that are called during the execution of the software program, and their addresses, which in turn indicate where in the memory program the instructions are stored, as well as counts of times particular functions are called. The analyzer 20 can store the collected data in a non-transitory log memory buffer 21.

The system 1 also includes a software analysis device 30 (or information processing apparatus 30) capable of communicating with the computing system 10 via a communications device 33, for example. The data that is stored in the log memory buffer 21 can be conveyed to the software analysis device 30. The software analysis device 30 is also configured to have a processor 31 for analyzing the execution of a software program and a non-transitory memory 32 capable of storing a program for analyzing the execution of a software program. Likewise, the device 30 can be in communication with an input 14' and a display 12'.

The analysis device 30 is also configured with an analyzer 34 that can analyze the dynamic program behavior of a software program based on the analysis data provided from the computing system 10. Any of the components shown in system 1 could be incorporated in system 10 and/or on a remote system connected via a network (e.g., in the cloud or datacenter).

Display 12' can display a visualization of the analysis being performed by device 30. For example, a user can play a video game using system 10 where the game is displayed on display 12 while device 30 analyzes the gameplay and displays a visualization on display 12'. The technology is not limited to separately displaying these items and the same information can be conveyed on a single display or across a multitude of displays.

FIG. 2 shows a non-limiting example for sampling multiple call stacks using a software profiler. In the example shown in FIG. 2, call stack samples CS1-CSn are sampled during execution of a running program. Each call stack has an associated root function RF1, one or more intermediate functions IF1, and a leaf function LF1. The root function RF1 is representative of a base function (e.g., a first function) that is called in a particular call stack when executing a process. Likewise, the intermediate functions IF1 could be representative of one or more functions that have been called between the root function RF1 and the currently execution function (i.e., the leaf function LF1). Storing information regarding the root function RF1 and intermediate functions IF1 can be advantageous when attempting to infer which call stacks are associated with a sampled call stack.

It should be appreciated that a leaf function LF1 can represent a currently running function that is being called during a particular sample. That is, the software profiler may collect samples at various points of time during program execution and at a certain point in time, the currently running function (e.g., the "leaf" function) can be recorded along with the stack depth size SD1 measuring the depth of a stack in bytes, for example. It should be appreciated that stack depth size is not limited to measuring how big in size the stack is at a particular point in time and could be measured using a variety of alternatives, including measuring how long a stack has been executing a particular process. The information sampled in FIG. 2 can be recorded in a database (e.g., a call stack database) for use in inferring which later call stacks should be associated with a known call stack stored in the database.

FIG. 3 shows a non-limiting example of functions sampled by a software profiler without associated call stacks. In the example shown in FIG. 3, the software profiler could sample several leaf samples LS1-LSn and in sampling the leaf samples LS1-LSn, the profiler could record the currently executing function (e.g., the "leaf" function) as well as a measured stack depth size SD1 at that point in time. That is, in the example shown in FIG. 3, the profiler records only the measured stack depth size SD1 as well as the currently executing function (leaf function LF1) without recording the other information associated with the call stack (e.g., the root functions and intermediate functions).

Thus, FIG. 3 shows an example simple profile where certain functions can be executing where each executing function has an associated stack depth size. Using this information alone, many call stacks can be inferred from these executing functions by referencing this information against a database (e.g., a call stack database).

It should be appreciated that the information obtained from the initially sampled program may be stored in a database or in any storage medium in which the information can later be accessed (e.g., by indexing elements of the stored information). For example, the information can be stored in a text file, a comma and/or tab separated file, and XML document, or any other variety of known file types in which information can be stored in a tabular manner and accessed by a software program. In other example embodiment, the information stored in the database may also be used as a database of examples for a training set that is input into a machine learning algorithm.

FIG. 4 depicts a non-limiting example of how samples shown in FIG. 3 can be converted to inferred call stacks using the call stack database formed from the procedures described with respect to FIG. 2 as the key. In the example shown in FIG. 4, the system can use the leaf function and stack depth size (e.g., measured in bytes) in an attempt to match those values to a complete call stack (e.g., stored in a call stack database). It should be appreciated that not all of the samples shown in FIG. 4 may be matched to data stored in a call stack database. For example, leaf samples LS7 and LS8 show examples of two functions having respective stack depths where the call stack is unknown (represented by unknown functions UF1 and UF2).

Other leaf samples may have matched to known call stacks in the call stack database. For example, leaf sample LS1 has a leaf function noted as "Function D" and a stack depth size of 592 bytes. Using these two values alone, the system can look to the call stack database to see if there is a possible match. In the example shown in FIG. 4, leaf sample LS1 has matched a known sample in the database that has a leaf function as "Function D" and a stack depth size of 592 bytes. That is, the information in the database indicates that a call stack with stack depth size of 592 bytes having a leaf function of "Function D" will most likely have a call stack including intermediate functions A, B, and C (CS6 in FIG. 2). Thus, the profiler can advantageously analyze an executing program and infer which call stacks certain functions belong to simply by comparing the executing function and stack depth size against a known leaf function and stack depth size stored in a database (e.g., call stack database). This allows the profiler to analyze the running program and infer call stacks of executing functions by only knowing how deep a stack is for an executing function (as well as by virtue of the name/type of the running function itself).

As shown in FIG. 4, there will be certain instances where a call stack cannot be inferred just by comparing the leaf function and stack depth size to known samples. For example, there could be instances where the call stack database may have more than one call stack matching a stack depth size and leaf function of a currently executing function. Using the example from FIG. 4, the call stack database could encounter an instance where the sampled call stacks have more than one call stack with a leaf function of "Function D" and a stack depth size of 592 bytes. Likewise, there could be instances where the call stack database produces no match to a known call stack having a leaf function of "Function D" and stack depth size of 592 bytes. In these instances, the profiler can employ additional methods when inferring which call stack the function should be associated.

Figure 5:
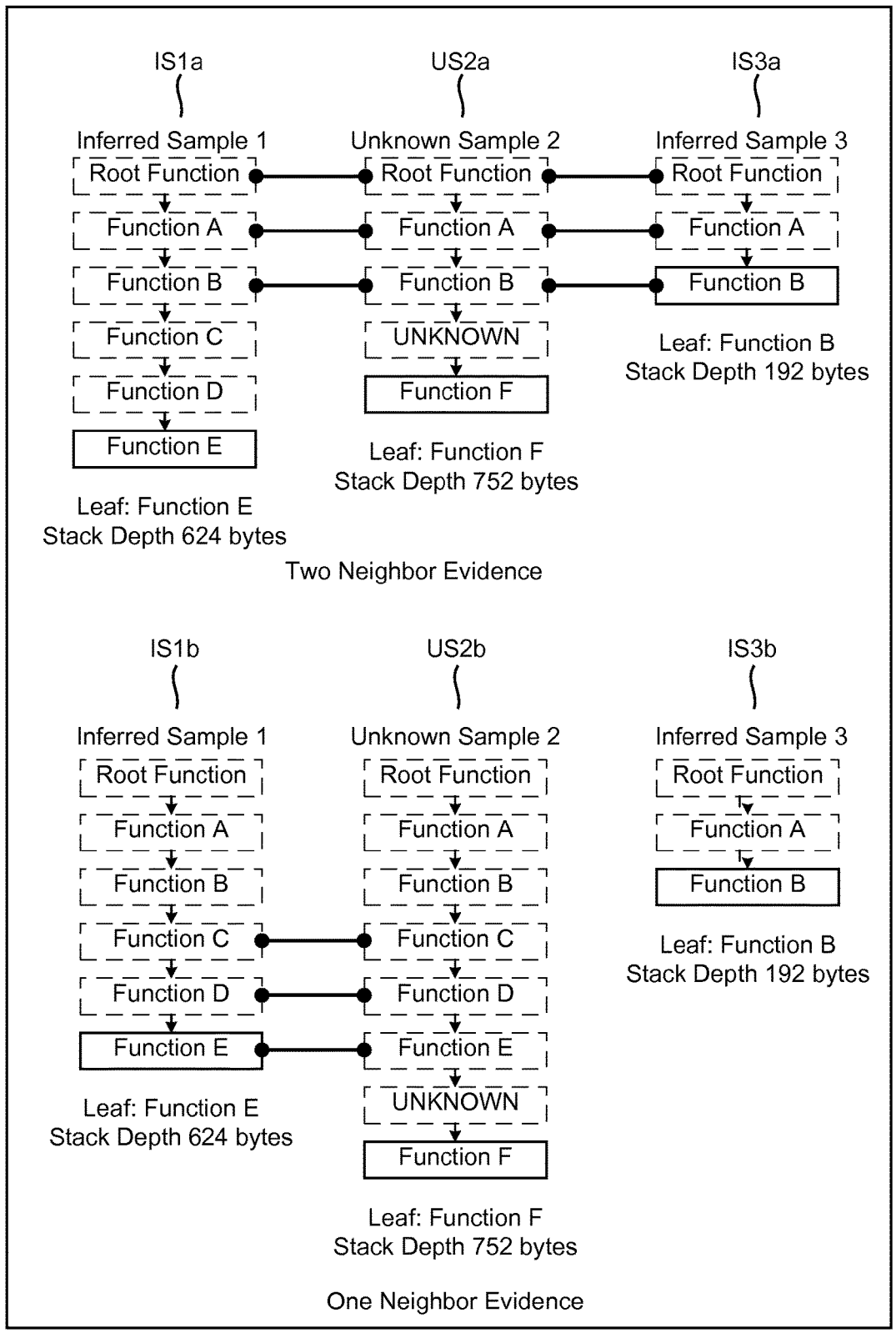
FIG. 5 shows a non-limiting example diagram for methods used to aid in inferring a call stack.

FIG. 5 shows a non-limiting example of how samples taken before and after an unmatched unknown sample can be used to guess at part of the call stack. In the example shown in FIG. 5, at least two methods can be employed to infer a call stack from a function having a leaf function and/or stack depth size that is unknown to the database. Both of these methods take into account one or more neighboring functions (e.g., neighboring in sequence/time of execution) to infer the content of the leaf function in question's call stack. It should be appreciated that neighboring in sequence and/or in time could refer to neighboring in sequence of execution and/or time of execution. For example, a neighboring function could be considered as a function that directly precedes or directly follows a currently executing function being sampled and/or analyzed. Likewise, the neighboring function may indirectly precede or indirectly follow the currently executing function (e.g., executes a few functions prior to or executes a few functions following the currently executing function).

In the example shown in FIG. 5, unknown samples US2a and US2b have a leaf function as "Function F" and a stack depth size of 752 bytes. In this example, the database could not match any functions having a leaf function of "Function F" and stack depth size of 752 bytes. Thus, the system can infer which functions could make up the intermediate functions running between a root function and a leaf function by looking to the neighbor "evidence."

In the example shown in FIG. 5, a two neighbor evidence method can be employed to determine which intermediate functions make up a call stack for unknown sample US2a. As can be seen in FIG. 5, unknown sample US2a has a neighboring sample (e.g., neighboring in sequence/time) illustrated to the left of the sample (e.g., prior in time) as inferred sample IS1a, and a neighboring sample illustrated to the right of the sample (e.g., subsequent in time) as inferred sample IS3a. In this example, both inferred sample IS1a and IS3a have different leaf functions and stack depth size as unknown sample US2a. But, certain intermediate functions can be inferred as existing in unknown sample US2a based on their commonality to functions in inferred samples IS1a and IS3a. For example, both samples IS1a and IS3*a* have common root functions as well as Function A and Function B. Thus, the system can infer that at least the root function, Function A, and Function B make up the call stack for unknown sample US2*a*. It should be appreciated that the system may not be able to entirely infer the remaining functions in the call stack or may conclude that the call stack should only consist of the functions based on the results of the neighbor evidence. In this respect, the system can employ alternate methods for determining which functions comprise the call stack.

Instead of (or in addition to) using evidence from two neighboring samples, the system may take evidence from only one neighboring sample. In the example shown in FIG. 5, the system infers other functions being called in the call stack based on evidence from the neighboring sample inferred sample IS1*b* (i.e., to the left of the unknown sample US2*b*). In this example, Functions C, D, and E are used to infer additional functions in the call stack for unknown samples US2*b*. The functions from inferred sample IS3*b* are not used for this portion of the analysis because, in part, inferred sample IS3*b* has no additional functions than the ones that were in common with inferred sample IS1*b*. It should be appreciated that the system can employ any variation of this process here and is not limited to what is shown in this example. For example, inferred sample IS3*b* may have additional functions not common to inferred sample IS1*b* (e.g., Functions X, Y, and Z). Thus, a decision could be made to simply ignore those functions when inferring the functions in the call stack for unknown sample US2*b*.

It should be appreciated that inferring call stacks from one or more neighboring samples can lead to accurate results because the call stack will have many functions in common with neighboring samples when being sampled/analyzed at different points in time. This could be due to, for example, certain functions not having yet been popped from the call stack. That is, the call stack can be thought of as quite literally a stack of functions that are pushed onto the stack in order and popped from the stack in the reverse order in which they were pushed. In the example of FIG. 5, Functions A and B may not have necessarily been popped from the stack at points in time between when the function was called during execution of samples IS1*a* and IS3*a*. Thus, it is logical that when unknown sample US2*a* executes, Functions A and B will most likely comprise a portion of the call stack as they have not been popped from the stack by the time the functions in sample IS3*a* execute.

Likewise, one could infer that certain functions prior in time may still form a part of a currently running stack. For example, Functions C, D, and E could be inferred as still forming part of the call stack for unknown sample US2*b* as those functions may not have yet been popped from the stack by the time Function F in sample US2*b* executes. Furthermore, this inference could be made also given the fact that the stack depth size of sample US2*b* is greater than that of sample IS1*b*. That is, as sample US2*b* has a stack depth size of 752 bytes where sample IS1*b* (e.g., prior in sequence) has a stack depth size of 624 bytes, one could infer that by the time sample US2*b* functions are executing, that functions from the call stack have not been reduced, but have been increased. Under this assumption, the functions from sample IS1*b* can be added as "known" intermediate functions executing for sample US2*b*.

It should be appreciated that the methods employed in FIG. 5 do not necessarily have to be limited to only one function prior and/or subsequent in time. For example, the system could analyze several functions prior and/or subsequent in time (e.g., 5 functions) to determine which functions comprise the call stack for sample US2*b*. The system can also perform a search to find additional "unknown" functions that cannot be inferred based on neighbor evidence.

Figure 6:
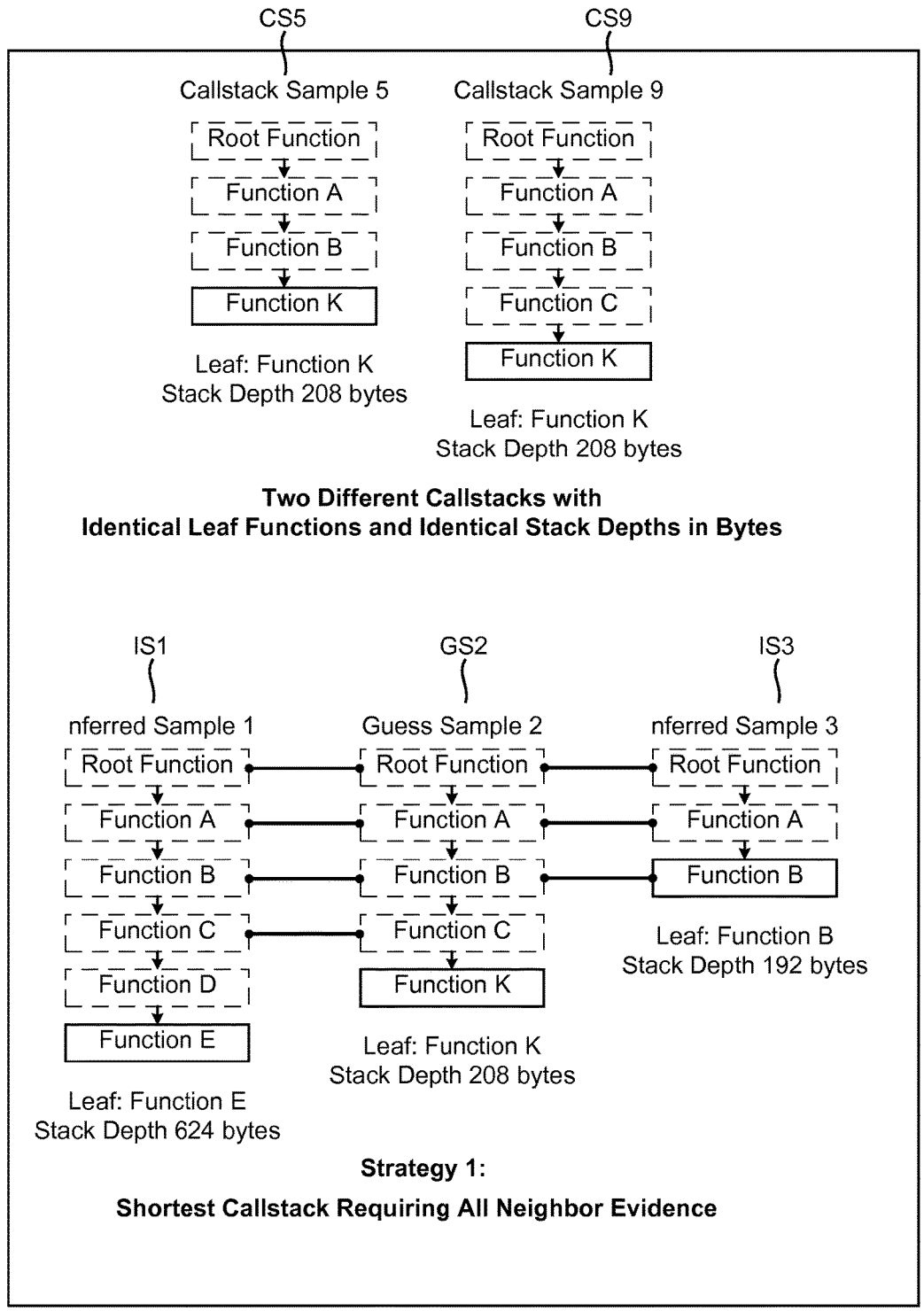
FIG. 6 shows a non-limiting example diagram of a strategy for inferring a call stack.

FIG. 6 shows a non-limiting example for inferring a call stack when there are two or more call stacks previously seen with identical leaf functions and identical stack depth sizes (e.g., in bytes) in the database. In the example shown in FIG. 6, call stack samples CS5 and CS9 are two different call stacks with identical leaf functions (i.e., Function K) and identical stack depth sizes (i.e., 208 bytes). This scenario could possibly occur where, when the sample was taken, a function may not necessarily have fully run. That is, the samples CS5 and CS9 may have been sampled at different points during execution of Function K. For example, sample CS5 may have been sampled at the point where Function K has fully executed, where sample CS9 may have been sampled at the point where Function K was called but has not executed any portion yet. Thus, when analyzing a currently executing function having the same function and stack depth size, the system cannot use the database alone for finding a match and must employ another strategy for determining which functions comprise the call stack.

In the example of FIG. 6, guess sample GS2 cannot be matched to one call stack alone as it also has a leaf function of Function K and stack depth size of 208 bytes. Thus, one method that could be employed is to select that sample in the database that most closely matches the neighboring evidence. In this example, the strategy employed looks for the shortest call stack requiring all neighbor evidence. That is, neighboring evidence that is common to either of the stored call stack samples may be used to generate the inferred call stack for sample GS2. For example, inferred samples IS1 and IS3 both have Function A and B in common (which are also common to samples CS5 and CS9). But, sample IS1 also comprises Function C (which is common to sample CS9). Thus, using this strategy, sample CS9 would be used as sample IS1 has more functions in common with sample CS9. One could also look at this method as performing a logical OR operation on each sample. That is, a logical OR is applied between samples CS5 and CS9 based on whether the functions common to both CS5 and CS9 have been called by any of the neighboring functions. As such, the system could infer that the proper call stack for sample GS2 corresponds to the call stack of sample CS9.

Figure 7:
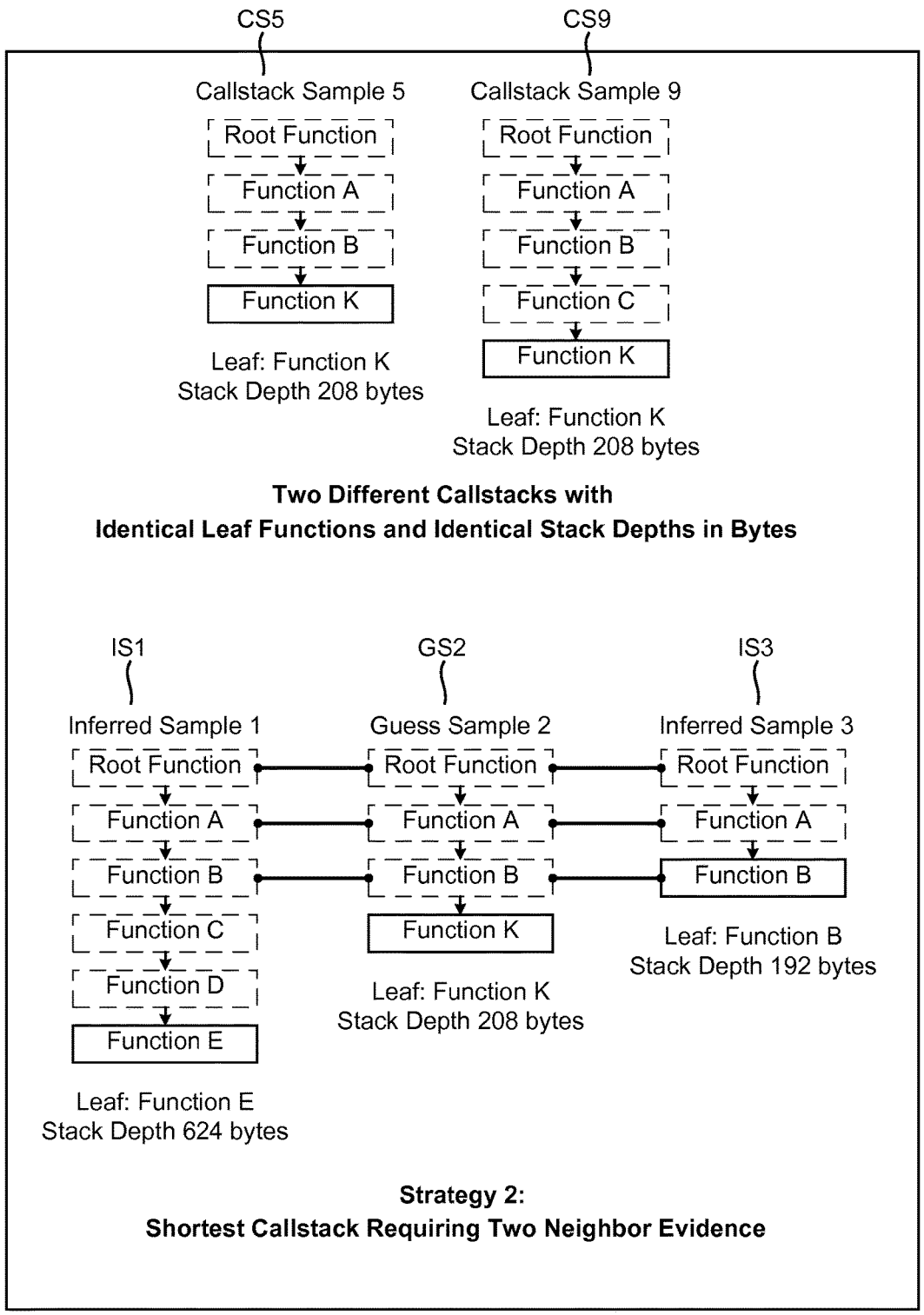
FIG. 7 shows another non-limiting example diagram of a strategy for inferring a call stack.

FIG. 7 shows another strategy the system could employ when there are two or more call stacks with identical leaf functions and identical stack depth sizes (e.g., in bytes). The strategy employed in FIG. 7 uses a shortest call stack requiring two neighbor evidence. That is, the strategy looks to both neighbors to determine which functions are in common between the neighbors and looks to match that set with a known call stack in the sample. In the example shown in FIG. 7, the system looks at neighboring samples of guess sample GS2 (i.e., inferred samples IS1 and IS3) and determines which, if any, functions are in common between the two samples. In this case, guess sample GS2 has Functions A and B in common between inferred samples IS1 and IS3. Thus, when matching between call stack samples CS5 and CS9, the system, employing the methodology of choosing the shortest call stack, will select sample CS5 as it also has Functions A and B in common. Thus, under the strategy shown in FIG. 7, the system essentially performs a logical AND operation by selecting functions in common with neighboring call stacks that also match a known sample (i.e., sample CS5).

Figure 8:
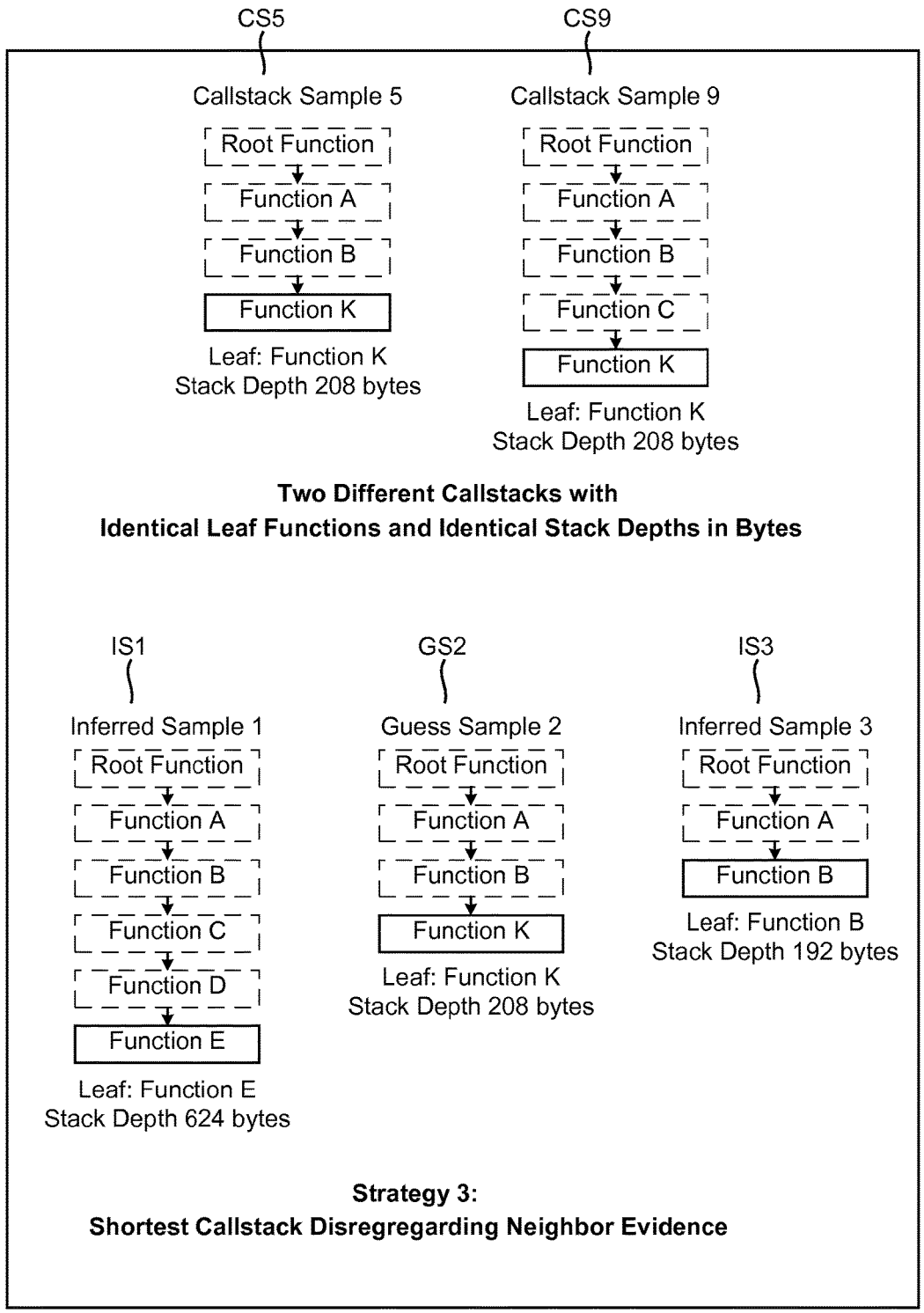
FIG. 8 shows another non-limiting example diagram of a strategy for inferring a call stack.

FIG. 8 shows another non-limiting example for determining which call stack to infer when there are two or more call stacks previously seen with identical leaf functions and identical stack depth sizes (e.g., in bytes). In the example shown in FIG. 8, the system employs a strategy that selects the shortest call stack by disregarding the neighbor evidence. In this example, if one or more call stacks match a leaf function and stack depth size in the call stack database, this strategy will pick the sample having the shortest call stack. That is, in the example shown in FIG. 8, sample CS5 will be selected as it has the shortest call stack compared to sample CS9. As an alternative, the system could count the number of times a particular call stack sample has been sampled and pick the sample having a highest number. For example, sample CS5 may have been profiled ten times during the initial "calibration" profile where sample CS9 may have only been profiled four times. Thus, the system could select sample CS5 as it had more occurrences than sample CS9 during the initial profile. Of course, these strategies are non-limiting and the system envisions using a variety of alternate strategies in determining the best call stack to select.

Figure 9:
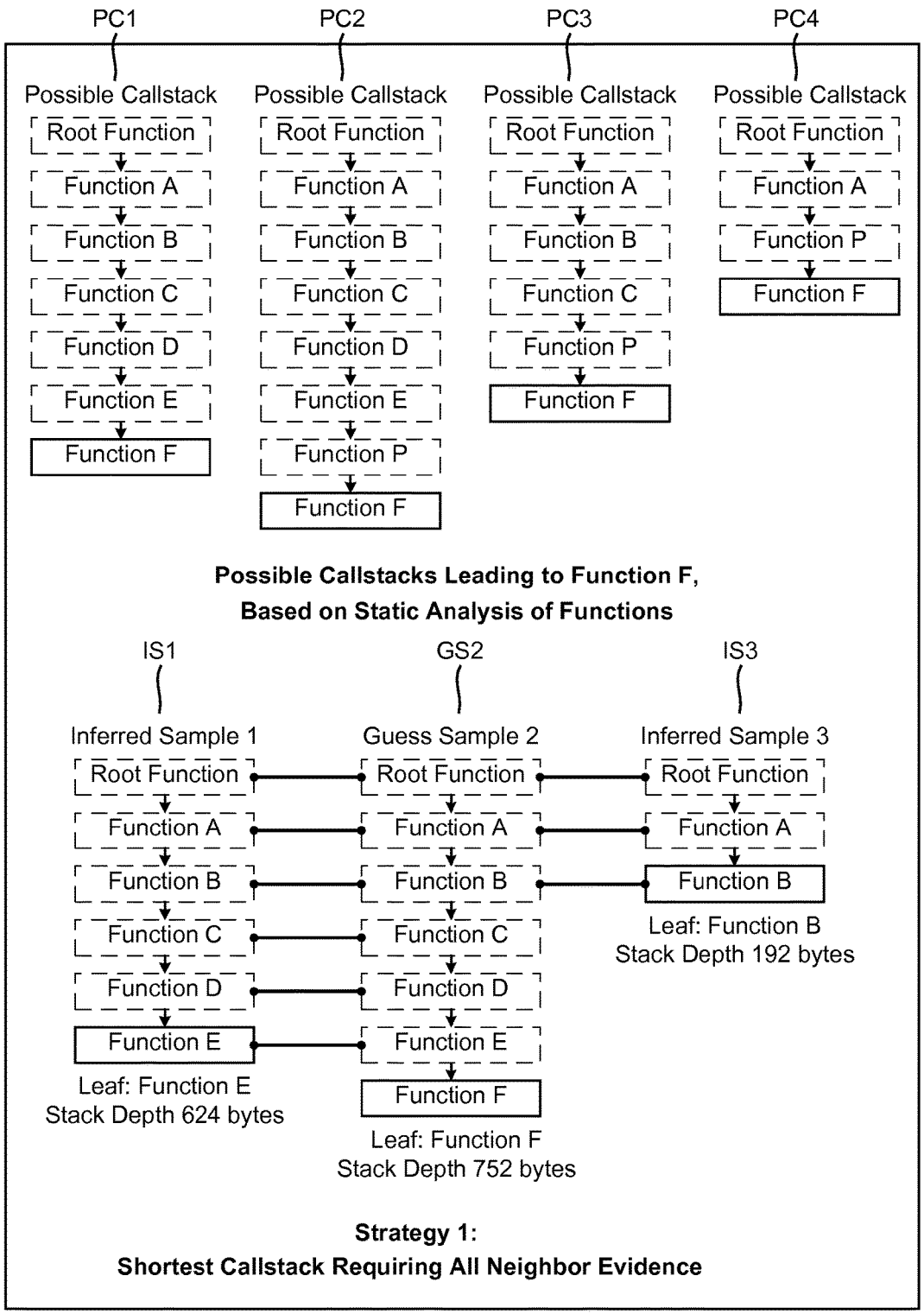
FIG. 9 shows a non-limiting example diagram of a strategy for inferring call stacks using static analysis.

FIG. 9 shows a non-limiting example for "guessing" a call stack when a call stack has not been seen with a particular leaf function and/or stack depth size (e.g., in bytes). The system could use static analysis information of which functions can call other functions and can "guess" the call stack by preferring a shortest call stack that contains the maximum amount of neighbor evidence (e.g., "one neighbor evidence" and "two neighbor evidence").

In the example shown in FIG. 9, there are several call stacks (possible call stacks PC1-4) that lead to leaf function "Function F" based on static analysis of the functions. Thus, when guess sample GS2 is analyzed, the system will attempt to match leaf function "Function F" with stack depth size of 725 bytes against the call stack database. When no result is returned, the system can employ several strategies in determining which call stacks of possible call stacks PC1-4 lead to Function F of sample GS2.

In the strategy shown in FIG. 9, the system could employ a method (similar to the one shown in FIG. 6) of selecting a shortest call stack requiring all neighbor evidence (e.g., a logical OR). In this example, the system will analyze each neighboring function and select a highest number of functions that are also in common with the possible call stacks. In this example, inferred samples IS1 and IS3 both have in common Function A and B, where sample IS1 also includes Functions C, D, and E. Using this strategy, Functions A-E are in common with call stack PC1 and PC2. But, call stack PC1 is the shorter call stack between the two and is thus selected over call stack PC2. As such, sample GS2 will be inferred as also having Functions A-E in common under this approach.

Figure 10:
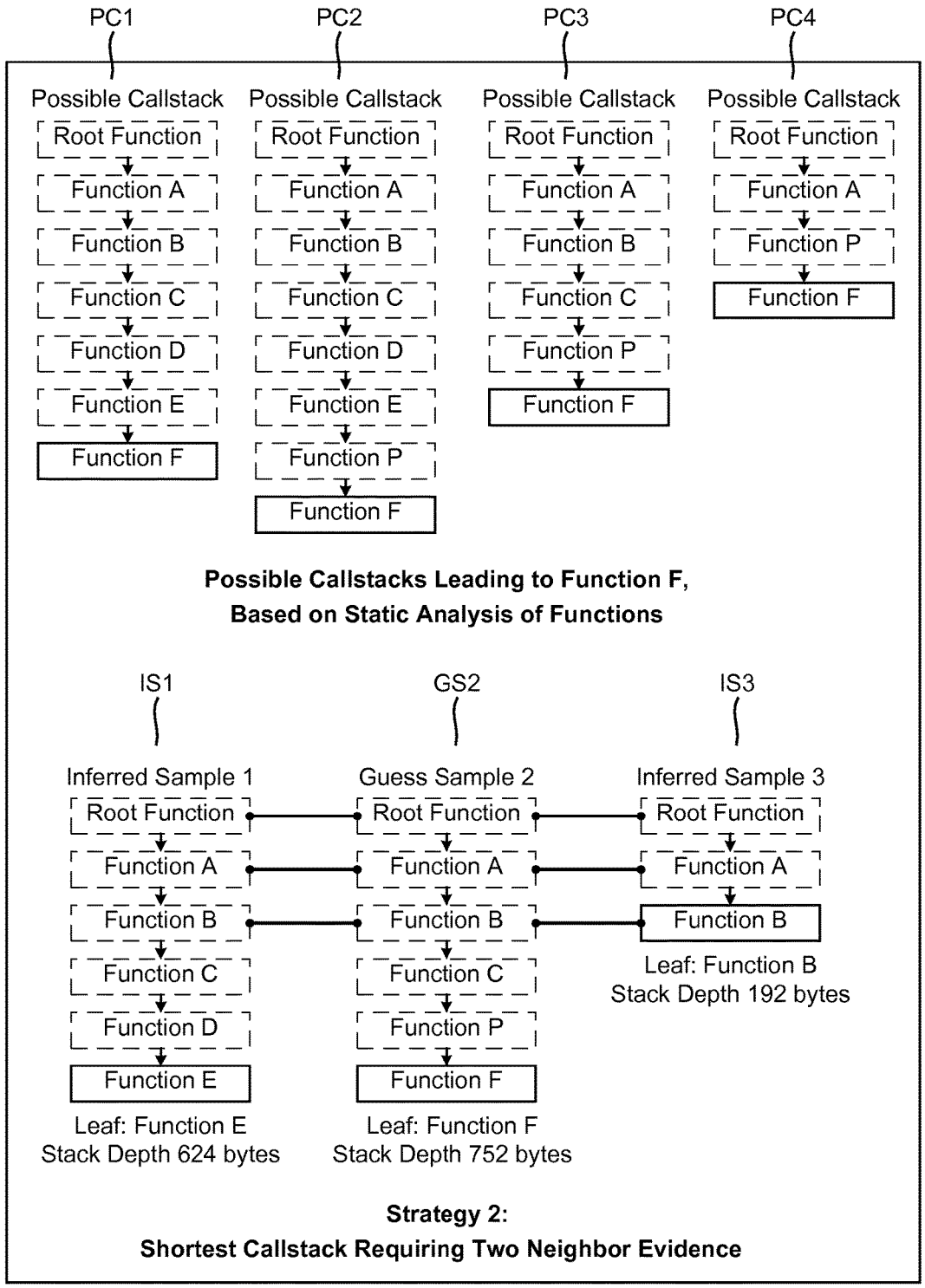
FIG. 10 shows another non-limiting example diagram of a strategy for inferring call stacks using static analysis.

FIG. 10 shows another non-limiting example for "guessing" a call stack when a call stack has not been seen with a leaf function and/or stack depth size. The system could use static analysis information of which functions can call other functions and can "guess" the call stack by preferring a shortest call stack that contains the maximum amount of "two neighbor evidence" (i.e., ignoring "one neighbor evidence"). Similar to the example shown in FIG. 9, several possible call stacks PC1-4 leading to Function F are derived based on static analysis of functions. The strategy employed in this example will analyze both neighbors of a guess sample GS2 (i.e., inferred samples IS1 and IS3) and select functions for the call stack that are common to both neighbors. In this example, both neighboring samples have Function A and B in common and thus the shortest call stack having at least these two functions in common is selected. That is, in the example of FIG. 10, possible call stack PC3 is the shortest call stack containing both Function A and B and thus call stack PC3 is used to "populate" the inferred call stack of sample GS2. Similar to the strategy employed in FIG. 7, this strategy uses a logical AND operation on neighboring call stacks to select a possible call stack.

Figure 11:
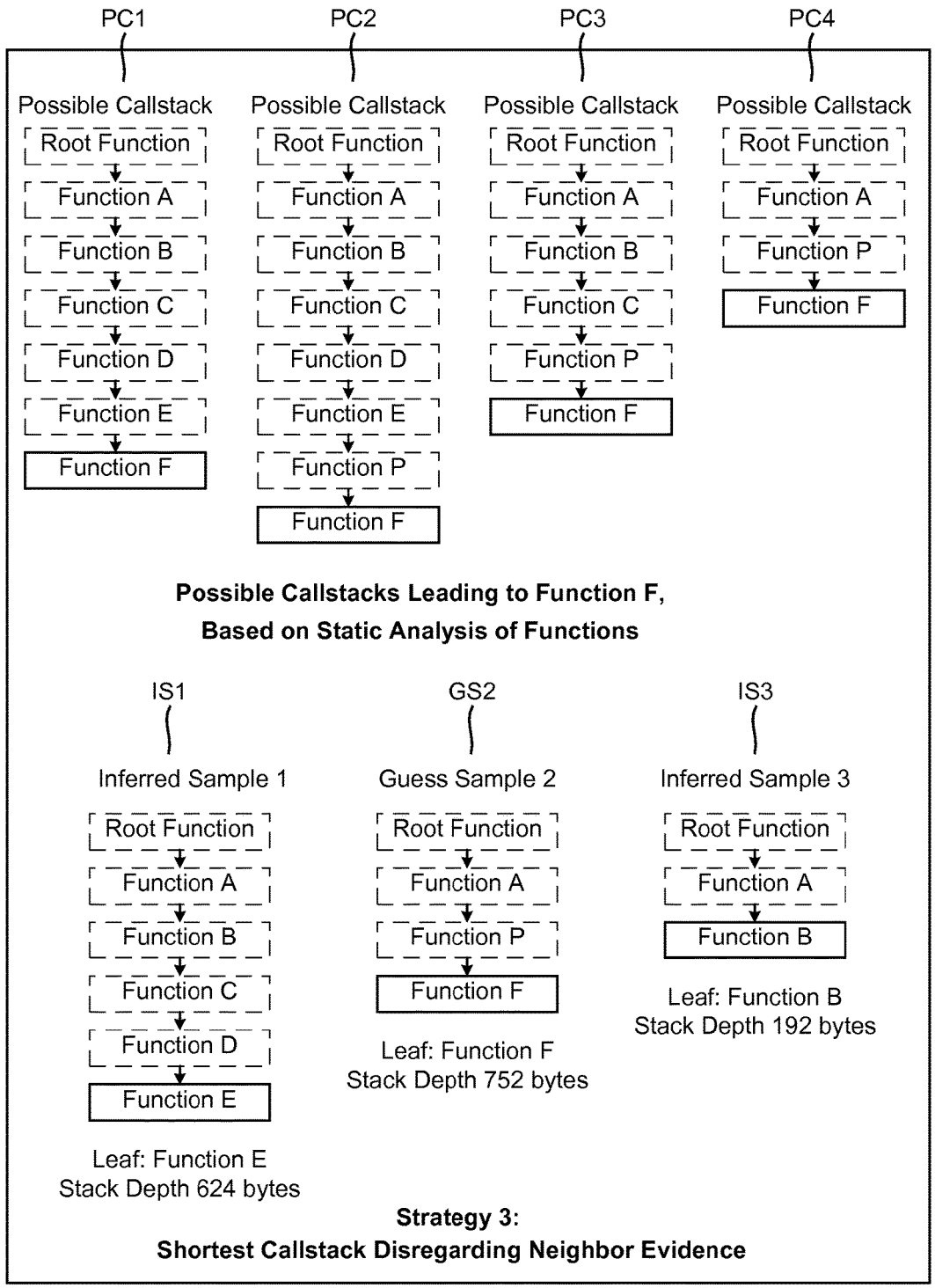
FIG. 11 shows a non-limiting example diagram of a strategy for inferring call stacks using static analysis.

FIG. 11 shows another example for "guessing" a call stack when a call stack has not been seen with a leaf function and/or stack depth size. The system could use static analysis information of which functions can call other functions and can "guess" the call stack by preferring a shortest call stack. The strategy employed in FIG. 11 could make this "guess" by ignoring all neighbor evidence. For example, guess sample GS2 could be analyzed as having a leaf function "Function F" and stack depth size of 752 bytes. When compared to the database, no matches may result. As such, the possible call stacks PC1-4 (which are analyzed using static analysis of functions) is used to select a shortest call stack disregarding neighbor evidence. Thus, while sample GS2 has inferred samples IS1 and IS3 as neighbors, the system will select the shortest call stack from call stacks PC1-4. In this example, call stack PC4 contains the shortest call stack and is thus selected as being the inferred call stack for sample GS2. It should be appreciated that, again, the inferred call stacks are weighted and thus using this approach may result in an inferred call stack having a lower weight than that of other call stacks inferred through other approaches.

Figure 12:
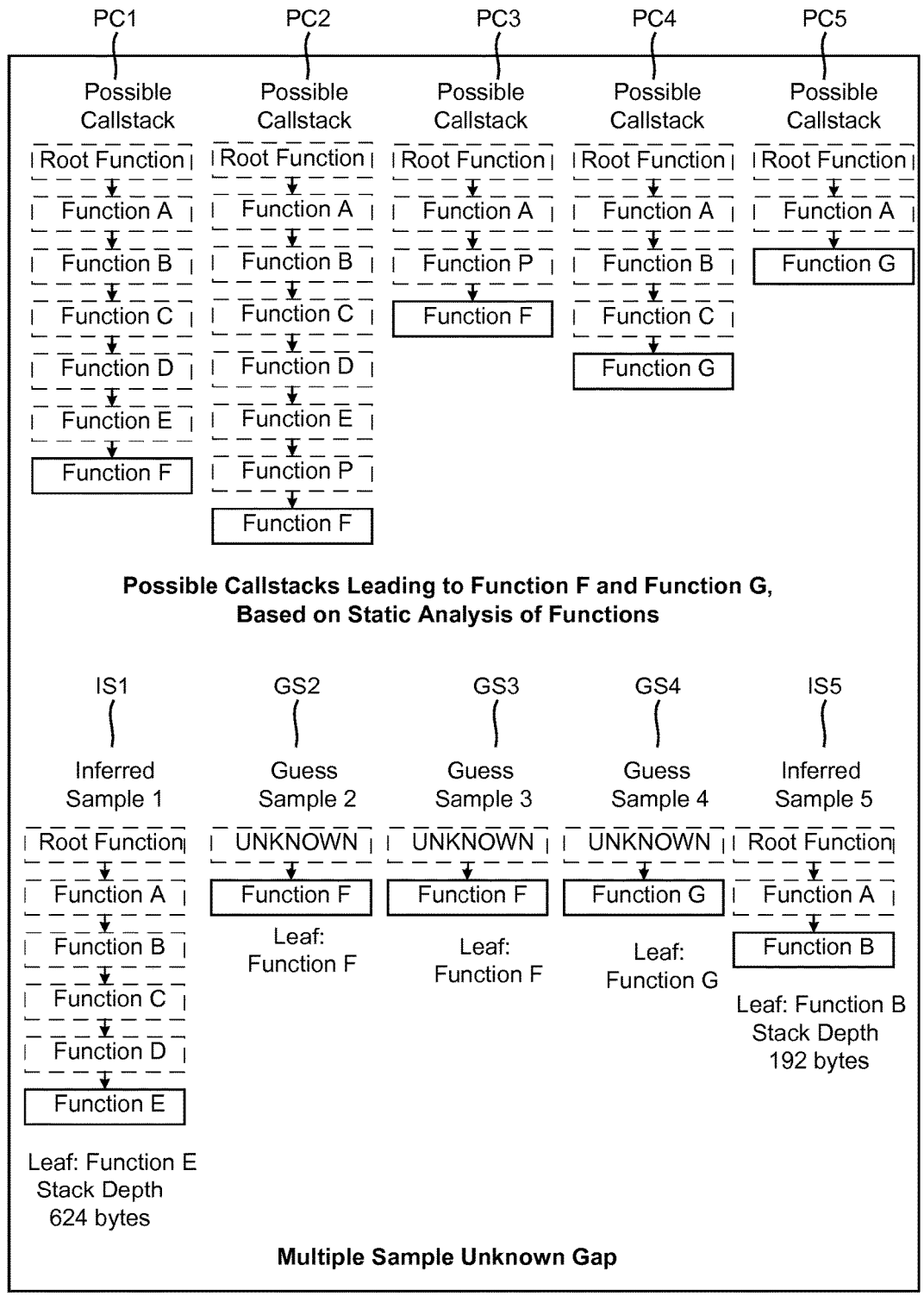
FIG. 12 shows another non-limiting example diagram of a strategy for inferring call stacks using static analysis.

FIG. 12 shows a non-limiting example where the gap between inferred samples contains multiple unknown samples. In the example shown in FIG. 12, guess samples GS2-4 form a gap between inferred samples IS1 and IS5. The system could employ strategies that also use a pool of possible call stacks PC1-5 that are formed from static analysis of functions to determine the paths leading to the leaf functions in samples GS2-4 (i.e., Function F and Function G). Thus, the example of FIG. 12 shows a situation where there is a gap of several samples that could not match to the call stack database.

Figure 13:
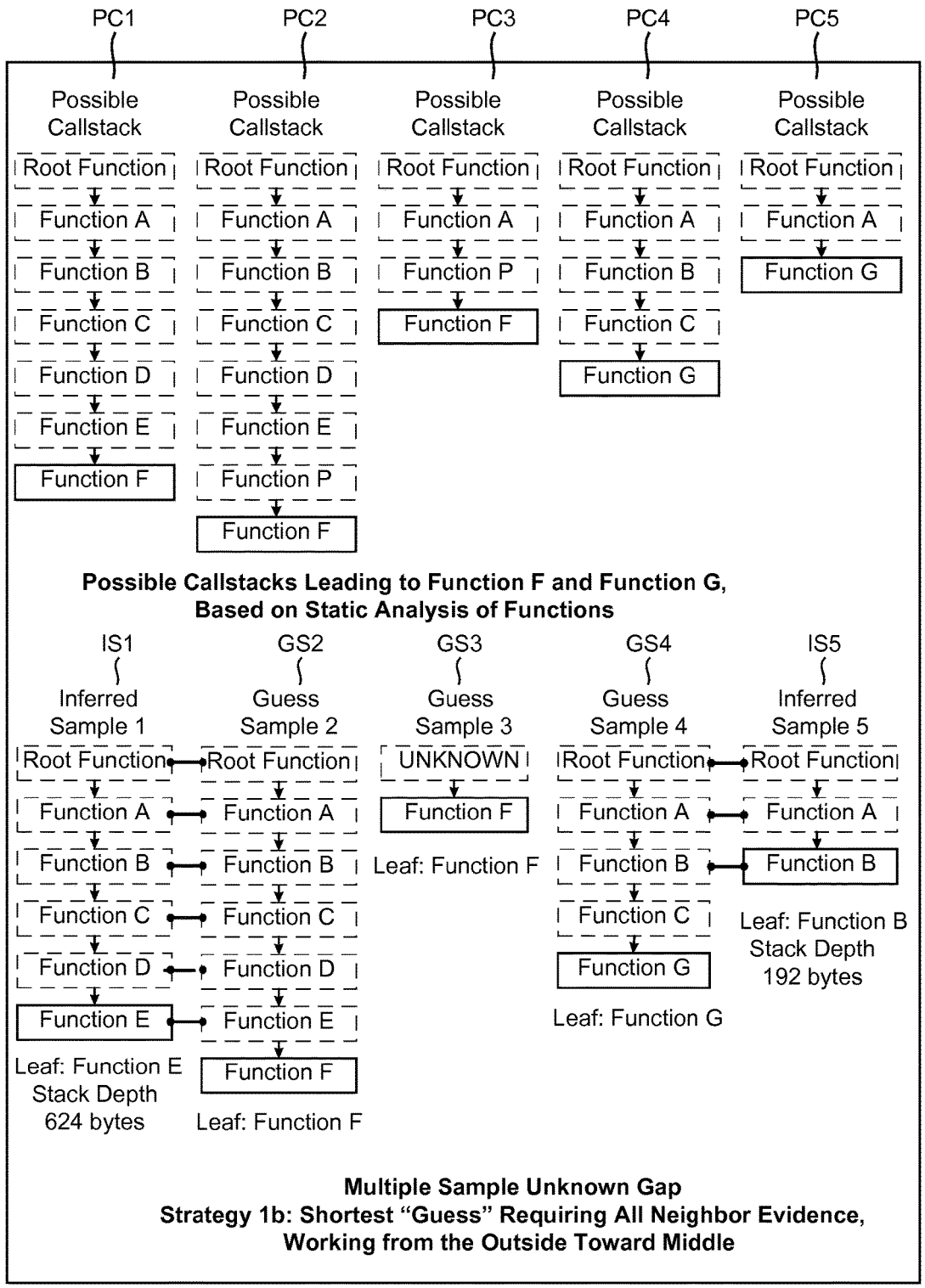
FIG. 13 shows another non-limiting example diagram of a strategy for inferring call stacks using static analysis.

FIG. 13 shows a non-limiting example for "guessing" at the unknown samples employing a strategy seen in FIG. 9. That is, the system can "work" from the outside inferred samples and move towards the middle to infer the call stacks of each guess sample in the gap. The strategy employed in FIG. 13 uses a shortest guess requiring all neighbor evidence, working from the outside toward the middle. For example, guess sample GS2 can be compared to neighboring inferred sample IS1 where sample IS1 contains Functions A-E. In this example, the system could select the shortest call stack having these functions from the possible call stacks PC1-PC5. As call stack PC1 and PC2 also have Functions A-E in common, the system would select call stack PC1 as it is shorter when compared to call stack PC2. Likewise, guess sample GS4 would be compared to neighboring inferred sample IS5 where it is determined that Function A and B comprise the call stack of sample IS5. The system could narrow the possible call stacks to call stacks PC1, PC2, and PC4 because they all have Function A and B in common. But, the system, using the strategy described in FIG. 13, would select call stack PC4 as it is the shortest of the call stacks compared to call stacks PC1 and PC2. The system could iteratively continue this process as it progresses towards the middle-most function in the gap, in this example, guess sample GS3.

Figure 14:
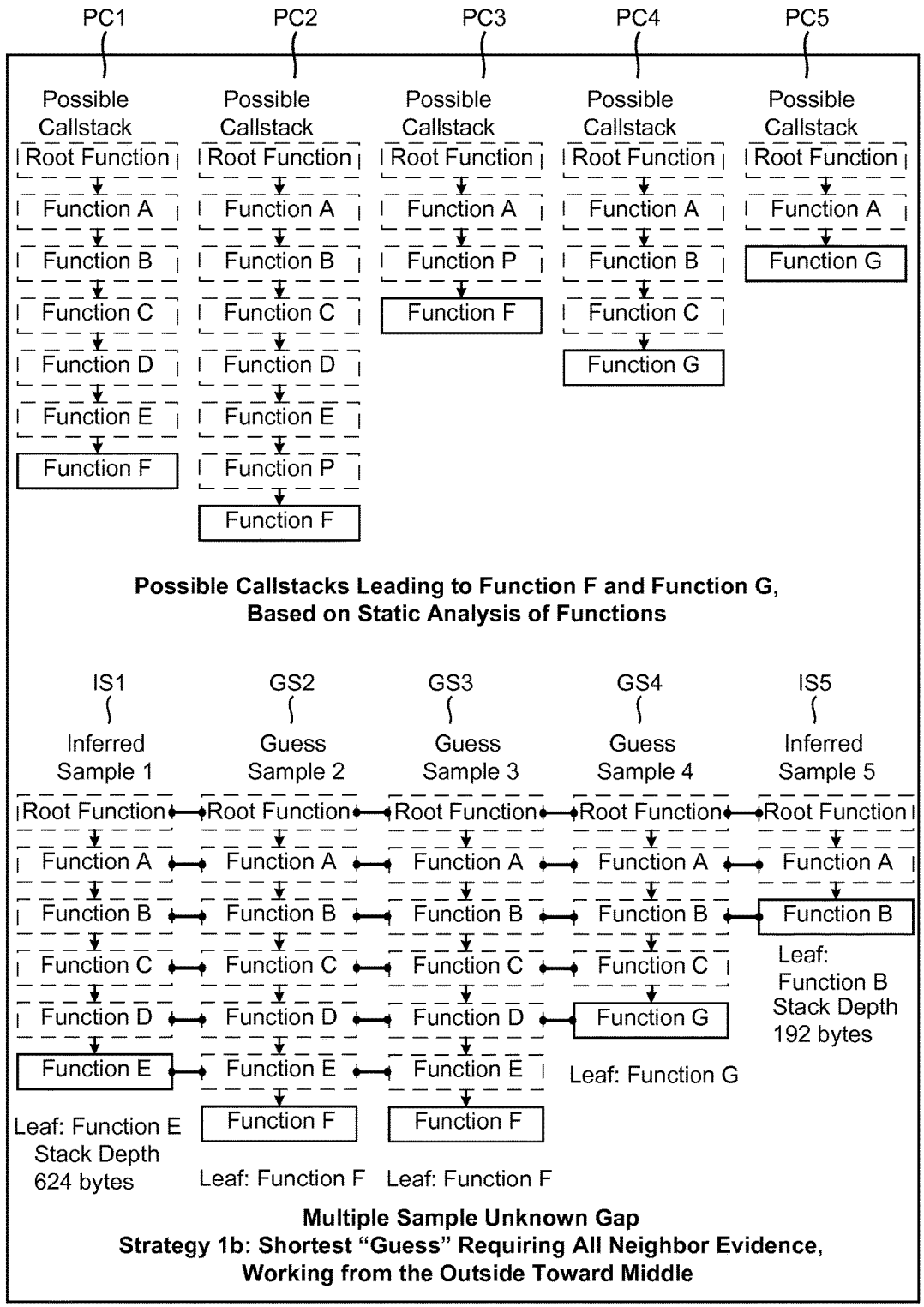
FIG. 14 shows another non-limiting example diagram of a strategy for inferring call stacks using static analysis.

FIG. 14 shows a non-limiting example where the strategy shown in FIG. 13 has been fully "solved." As shown in FIG. 13, guess samples GS2 and GS4 were inferred based on an analysis of neighboring inferred samples IS1 and IS5, respectively as well as possible call stacks PC1-5. However, FIG. 14 shows the solution for the remaining guess sample that is unsolved (i.e., guess sample GS3). In the strategy shown in FIG. 14, guess sample GS3 will analyze the inferred call stacks of now "solved" neighboring guess samples GS2 and GS4 and select the "best" call stack from possible call stacks PC1-5 based on this analysis. In this example, a path to leaf function "Function F" is analyzed using evidence from both neighboring samples. As sample GS4 has no inferred path to "Function F," sample GS2 will be more preferred in inferring which call stacks lead to "Function F." Here, sample GS2 has Functions A-E which are also found in possible call stacks PC1 and PC2. As call stack PC1 is shorter than call stack PC2, the system will infer that sample GS3 has a call stack of call stack PC1. Thus, sample GS3 will be inferred as including Functions A-E.

Figure 15:
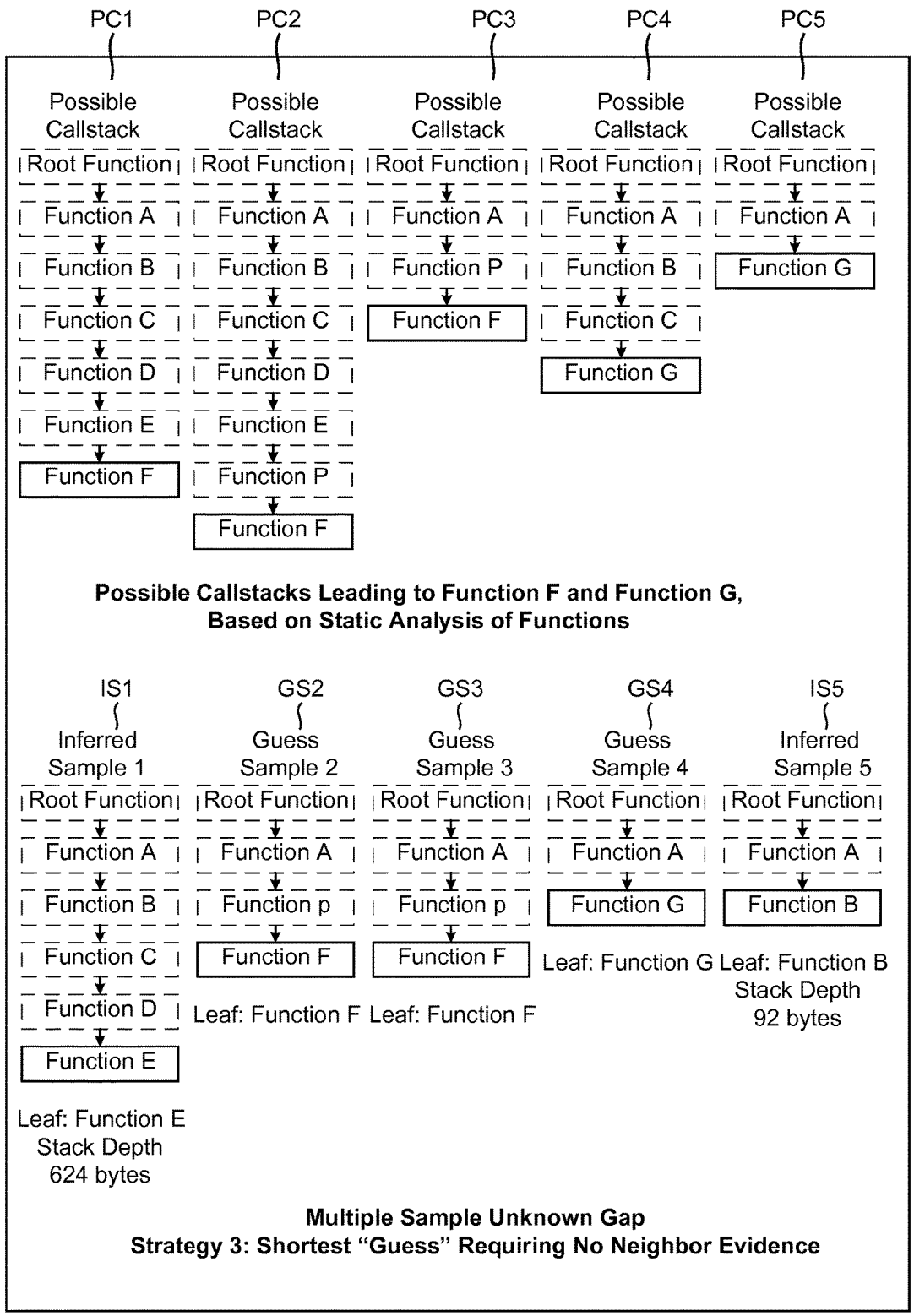
FIG. 15 shows another non-limiting example diagram of a strategy for inferring call stacks using static analysis.

FIG. 15 shows another non-limiting example where the solution for determining which call stack to infer among a gap of unknown samples is solved using a shortest guess requiring no neighbor evidence. Thus, in this example, inferred samples IS1 and IS5 are not as relevant to the analysis inasmuch as the call stack size of possible call stacks PC1-5. Here, guess samples GS2 and GS3 lead to leaf function "Function F" and thus possible call stack PC3 is selected as it is the shortest call stack from the pool of call stacks leading to "Function F." As such, samples GS2 and GS3 will comprise Functions A and P. Likewise, sample GS4 will comprise the functions of call stack PC5 which is the shortest call stack leading to Function G. Thus, sample GS5 will comprise Function A which matches the call stack of possible call stack PC5.

Figure 16:
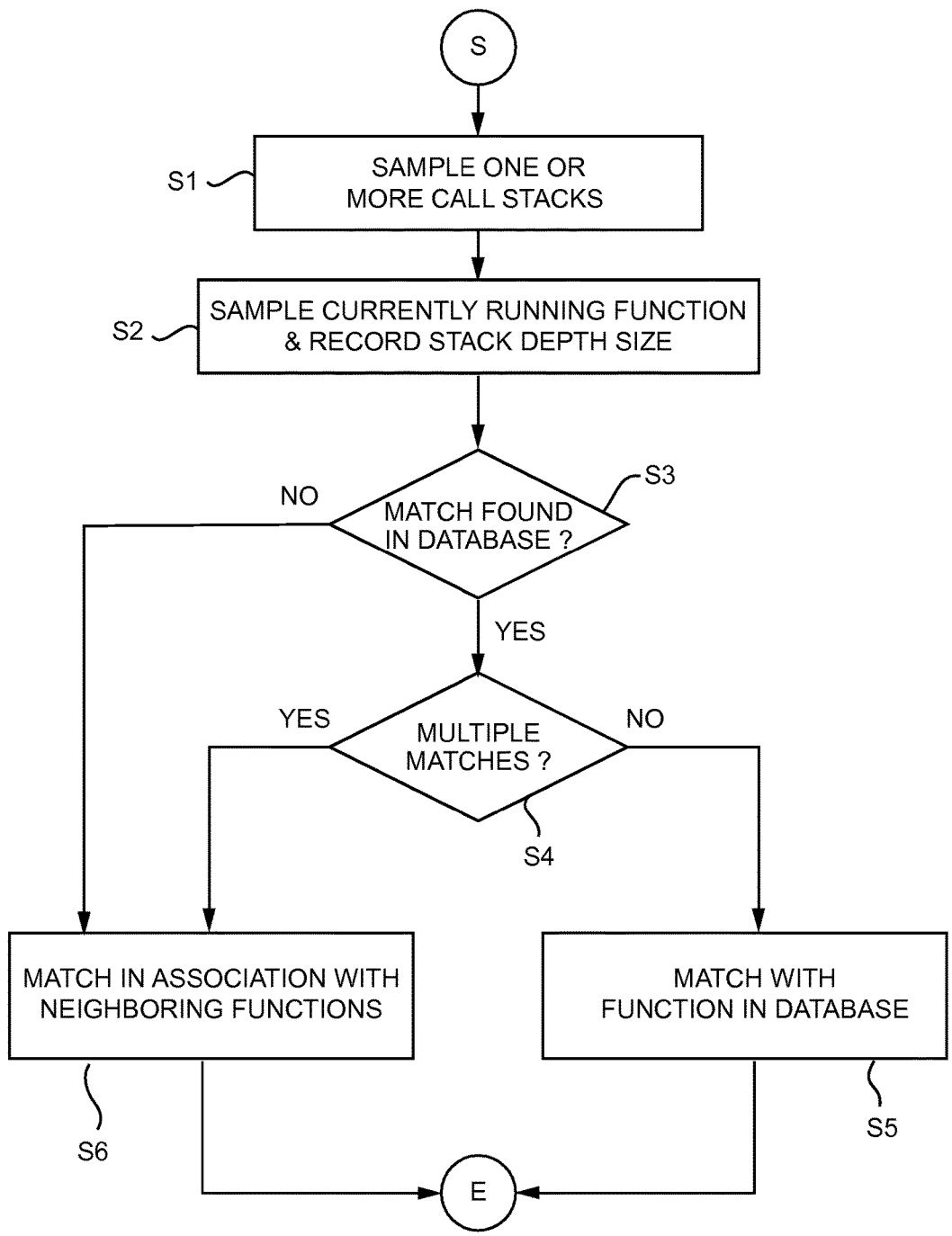
FIG. 16 shows a non-limiting example flow of processes for inferring call stacks.

FIG. 16 shows a non-limiting example of a flow of processes used for inferring a call stack of a currently executing function. The flow of processes of FIG. 16 describe a general procedure for inferring a call stack for a given executing function and can be carried out by system 1.

The process begins by sampling one or more call stack profiles (S1) to build a database (e.g., call stack database). It should be appreciated that this process could be viewed as a "calibration" where the system initially samples several call stack profiles to form a set or database of call stack profiles. These sampled profiles are later used to infer call stacks of a currently executing function. In this process, CPU core and thread information can also be optionally recorded.

After creating a database from the sampled call stack profiles, the system can sample a currently running program to sample one or more currently running functions (S2). In performing this process, the system can record the currently running function as well as the stack depth size (e.g., in bytes). In this process as well, CPU core and thread information can also be optionally recorded.

Upon obtaining the currently running functions and stack depth size, the system can compare these two values to determine if a profile in the database matches a leaf function and stack depth size (S3). If there is no match, the system can attempt to infer the call stacks for a given function based on evidence related to (or unrelated to) neighboring call stack samples, as discussed in further detail with respect to FIGS. 9-15.

If there is a match, the system can determine if there are multiple matches (S4). If multiple matches exist, the system can also attempt to match a call stack for a given function based on evidence related to (or unrelated to) neighboring call stack samples (S6). In this instance, the system could employ the procedures discussed with respect to FIGS. 5-8.

If the system does not have multiple matches, the system infers the call stack based on the match found from the database (S5). It should be appreciated that the system can also weight the inferred call stacks to allow an individual viewing the analysis to have an appreciation of a degree of confidence that the call stack has been properly inferred. The system can also filter certain functions from analysis when, for example, examining "neighboring" functions. For example, the system can filter functions to include only neighboring functions that are executing on the same core and/or thread as the function for which the system is attempting to infer the call stack.

While the technology has been described in connection with what is presently considered to be the most practical and preferred embodiment, it is to be understood that the technology is not to be limited to the disclosed embodiment, but on the contrary, is intended to cover various modifications and equivalent arrangements.

At least the following is claimed:

1. A system for inferring call stacks from a software profile, comprising:
   a processing system having at least one processor, the processing system configured to:
      monitor an executing program to create a sample profile of one or more executing functions to form a call stack database, wherein each function in the sample profile forms part of a respective call stack and each call stack having a call stack depth size;
   after creating the call stack database:
      for each function, attempt to match, under a first inference strategy, the function and associated call stack depth size to an entry in the call stack database;
      infer a call stack for each function that matches to the entry in the call stack database based on the first inference strategy;
      if the function does not match with any entry in the call stack database or if the function matches to more than one entry in the call stack database, determine, under a second inference strategy, one or more functions in a temporally adjacent sample; and
      infer the call stack, under the second inference strategy, based on at least the temporally adjacent sample.

2. The system of claim 1, wherein if a group of temporally adjacent samples do not match any entries in the profile database, the processing system is further configured to infer the call stack for the group, under the second inference strategy, based on, at least, a correctly correlated sample that is temporally adjacent to at least one sample in the group.

3. The system of claim 2, wherein each sample in the group is correlated based on, at least, a first correctly correlated sample that is temporally adjacent to at least one sample in the group at a first point in time and a second correctly correlated sample that is temporally adjacent to at least one sample in the group at a second point in time.

4. A system for inferring call stacks from a sample profile of one or more functions, comprising:
   an information processing system configured to execute a program that forms a call stack database, wherein each function in the sample profile forms part of a respective call stack and each call stack having a call stack depth size; and a processing system having at least one processor, the processing system configured to:
for each function, attempt to match, under a first inference strategy, the function and associated call stack depth size to an entry in the call stack database;
infer a call stack for each function that matches to the entry in the call stack database based on the first inference strategy;
if the function does not match with any entry in the call stack database or if the function matches to more than one entry in the call stack database, determine, under a second inference strategy, one or more functions in a temporally adjacent sample; and
infer the call stack, under the second inference strategy, based on at least the temporally adjacent sample.

5. The system of claim 4, wherein the processing system is further configured to create the call stack database by sampling the program as the program executes and storing, for each call stack associated with a sampled function, the call stack depth size and a leaf function.

6. The system of claim 5, wherein inferring the call stack for each function includes, at least, correlating the function and the call stack depth size to at least one call stack depth size and leaf function stored in the call stack database.

7. The system of claim 5, wherein creating the call stack database includes recording a core and thread identifier associated with the function.

8. The system of claim 4, wherein if a group of temporally adjacent samples do not match any entries in the call stack database, the processing system is further configured to correlate each sample in the group based on, at least, a correctly correlated sample that is temporally adjacent to at least one sample in the group.

9. The system of claim 4, wherein the inferred call stacks are weighted based on a degree of confidence that the respective call stack has been properly inferred.

10. The system of claim 4, wherein the callstack is inferred based on, at least, one or more functions neighboring in sequence in the temporally adjacent sample.

11. A method for inferring call stacks from a sample profile, comprising:
at an information processing system having at least one processor and configured to execute a program that forms a call stack database, wherein each function in the sample profile forms part of a respective call stack and each call stack having a call stack depth size:
for each function, attempting to match, under a first inference strategy, the function and associated call stack depth size to an entry in the call stack database;
inferring a call stack for each function that matches to the entry in the call stack database based on the first inference strategy;
if the function does not match with any entry in the call stack database or if the function matches to more than one entry in the call stack database, determining, under a second inference strategy, one or more functions in a temporally adjacent sample; and
inferring the call stack, under the second inference strategy, based on at least the temporally adjacent sample.

12. The method of claim 11, wherein creating the call stack database includes sampling the program as the program executes and storing, for each call stack associated with a sampled function, the call stack depth size and a leaf function.

13. The method of claim 12, wherein inferring the call stack for each function includes, at least, correlating the function and the call stack depth size to at least one call stack depth size and leaf function stored in the call stack database.

14. The method of claim 12, wherein creating the call stack database includes recording a core and thread identifier associated with the function.

15. The method of claim 11, wherein if a group of temporally adjacent samples do not match any entries in the call stack database, each sample in the group is correlated based on, at least, a correctly correlated sample that is temporally adjacent to at least one sample in the group.

16. The method of claim 11, wherein the inferred call stacks are weighted based on a degree of confidence that the respective call stack has been properly inferred.

17. A non-transitory computer readable storage medium comprising:
a computer program having code executable by an information processing system configured to infer call stacks from a sample profile of one or more functions executing in a program that form a call stack database, wherein each function in the sample profile forms part of a respective call stack and each call stack having a call stack depth size, the computer program, when executed, causing the information processing system to:
for each function, attempt to match, under a first inference strategy, the function and associated call stack depth size to an entry in the call stack database;
infer a call stack for each function that matches to the entry in the call stack database based on the first inference strategy;
if the function does not match with any entry in the call stack database or if the function matches to more than one entry in the call stack database, determine, under a second inference strategy, one or more functions in a temporally adjacent sample; and
infer the call stack, under the second inference strategy, based on at least the temporally adjacent sample.

18. The non-transitory computer readable storage medium of claim 17, wherein the call stack database is created by sampling the program as the program executes and storing, for each call stack associated with a sampled function, the call stack depth size and a leaf function.

19. The non-transitory computer readable storage medium of claim 18, wherein inferring the call stack for each function includes, at least, correlating the function and the call stack depth size to at least one call stack depth size and leaf function stored in the call stack database.

20. The non-transitory computer readable storage medium of claim 18, wherein creating the call stack database includes recording a core and thread identifier associated with the function.

21. The non-transitory computer readable storage medium of claim 17, wherein if a group of temporally adjacent samples do not match any entries in the call stack database, the processing system is further configured to correlate each sample in the group based on, at least, a correctly correlated sample that is temporally adjacent to at least one sample in the group.

22. The non-transitory computer readable storage medium of claim 17, wherein the inferred call stacks are weighted based on a degree of confidence that the respective call stack has been properly inferred.

* * * * *